(12) United States Patent
Gaughf, Jr.

(10) Patent No.: US 11,524,729 B2
(45) Date of Patent: Dec. 13, 2022

(54) SPOILER FOR A PICKUP TRUCK BED

(71) Applicant: Darrell Eugene Gaughf, Jr., Summerfield, FL (US)

(72) Inventor: Darrell Eugene Gaughf, Jr., Summerfield, FL (US)

( * ) Notice: Subject to any disclaimer, the term of this patent is extended or adjusted under 35 U.S.C. 154(b) by 288 days.

(21) Appl. No.: 16/946,607

(22) Filed: Jun. 29, 2020

(65) Prior Publication Data
US 2020/0406990 A1 Dec. 31, 2020

Related U.S. Application Data

(60) Provisional application No. 62/868,239, filed on Jun. 28, 2019.

(51) Int. Cl.
| | |
|---|---|
| *B62D 35/00* | (2006.01) |
| *B66F 3/46* | (2006.01) |
| *B62D 37/00* | (2006.01) |
| *B62D 27/00* | (2006.01) |

(52) U.S. Cl.
CPC ........... *B62D 35/007* (2013.01); *B62D 27/00* (2013.01); *B62D 37/00* (2013.01); *B66F 3/46* (2013.01)

(58) Field of Classification Search
CPC .. B62D 35/007; B62D 35/001; B62D 35/002; B62D 37/02; B66F 3/46
USPC ................................ 296/180.1, 180.2, 181.5
See application file for complete search history.

(56) References Cited

U.S. PATENT DOCUMENTS

| | | | | |
|---|---|---|---|---|
| 3,350,063 A * | 10/1967 | Thurlowsr | ................ | B60S 9/12 |
| | | | | 254/423 |
| 3,697,044 A * | 10/1972 | Kowalski | .................. | B66F 3/46 |
| | | | | 414/498 |
| 3,999,796 A * | 12/1976 | Greene, Sr. | .......... | B62D 35/002 |
| | | | | 296/180.3 |
| 4,141,580 A * | 2/1979 | Ivan | ..................... | B62D 35/002 |
| | | | | 296/180.2 |
| 4,890,879 A * | 1/1990 | Hurlock | ............... | B62D 35/002 |
| | | | | 296/156 |
| 5,180,205 A * | 1/1993 | Shoop | .................. | B62D 35/002 |
| | | | | 296/168 |
| 5,335,960 A | 8/1994 | Benignu, Jr. | | |
| 5,551,747 A | 9/1996 | Larsen | | |
| 5,593,272 A * | 1/1997 | Green | ...................... | B60P 1/04 |
| | | | | 414/498 |

(Continued)

*Primary Examiner* — D Glenn Dayoan
*Assistant Examiner* — Kevin P Weldon
(74) *Attorney, Agent, or Firm* — Dunlap Bennett & Ludwig, PLLC

(57) ABSTRACT

A removable spoiler or vehicle stabilizing apparatus for a pickup truck having a truck bed is provided. The spoiler comprises a spoiler shell constructed and arranged to fit securely on the truck bed, an interior spoiler frame, at least one mounting support configured to securely support the spoiler on the truck bed, and a plurality of spoiler securement and lifting elements. The spoiler may easily be installed or removed from the truck even while the truck is hitched to a travel trailer, camper trailer or the like. The spoiler may be installed or removed with any suitable device, such as a crane, jack, jack stands, cherry picker, auto cherry picker, travel trailer tongue-mounted lift/crane, lifts, roll on/off platform or the like. The spoiler may also be used as a multipurpose device, and may provide a golf cart enclosure, and may further comprise at least one utility shelf.

16 Claims, 3 Drawing Sheets

(56) References Cited

U.S. PATENT DOCUMENTS

| | | | |
|---|---|---|---|
| 5,655,809 A | | 8/1997 | Hutchinson |
| 5,722,714 A | | 3/1998 | Vallerand |
| 5,735,567 A | | 4/1998 | Mora, Sr. |
| 5,743,589 A | | 4/1998 | Felker |
| 5,971,469 A | | 10/1999 | Lund et al. |
| 6,155,770 A | * | 12/2000 | Warhurst ............. B65D 90/143 414/458 |
| 6,712,423 B2 | | 3/2004 | Lehmann |
| 7,090,287 B1 | * | 8/2006 | Eberst ................ B62D 33/0273 296/180.1 |
| 7,182,395 B2 | | 2/2007 | Lehmann |
| 7,455,348 B1 | * | 11/2008 | Grover ................ B62D 35/001 296/180.1 |
| 7,857,376 B2 | | 12/2010 | Breidenbach |
| 8,182,020 B2 | | 5/2012 | Herndon |
| 8,727,424 B1 | | 5/2014 | Nelson |
| 10,011,309 B1 | * | 7/2018 | Suzuka ................ B62D 35/001 |
| 2005/0264034 A1 | | 12/2005 | Flores |
| 2010/0045069 A1 | | 2/2010 | Koba |
| 2010/0276967 A1 | | 11/2010 | Berg |
| 2017/0210430 A1 | | 7/2017 | Erlandson |
| 2018/0050581 A1 | | 2/2018 | Sheridan |
| 2019/0344837 A1 | * | 11/2019 | Toki .................... B62D 35/001 |

* cited by examiner

SPOILER FOR A PICKUP TRUCK BED

CROSS-REFERENCE TO RELATED APPLICATION

This application claims the benefit of priority of U.S. Provisional Application No. 62/868,239, filed Jun. 28, 2019, the contents of which are herein incorporated by reference.

BACKGROUND OF THE INVENTION

The present invention relates to spoilers and, more particularly, to a spoiler for a pickup truck bed.

A caravan, travel trailer, camper or camper trailer is towed behind a road vehicle to provide a place to sleep which is more comfortable and protected than a tent. Currently, while towing a travel trailer, wind force may make the driving experience hazardous.

The purchase of any vehicle, including pickup trucks, caravans, travel trailers, campers, camper trailers or the like is a significant investment for any individual, business or family. Safety during use of a pickup truck to tow a travel device such as a caravan, travel trailer, camper, camper trailer, or the like, is important not only for the protection of the driver and passengers, but also to safeguard the investment of the vehicle owner in such expensive vehicles and travel accessories.

As can be seen, there is a need for a device that operates to reduce the wind forces encountered by a vehicle while towing a travel trailer, and stabilizes and grounds the vehicle. Further, as leaving such a device on the vehicle may impact the availability of the pickup truck bed for other uses, there is a need for such a device that is easily installed and easily removable from a pickup truck bed to allow for conventional use of the pickup truck during travel and at home during times when a caravan, travel trailer, camper or camper trailer is not being towed. Further, there is a need for such removal and installation being possible whether or not the caravan, travel trailer, camper or camper trailer is hitched to the truck.

In addition, there is a need for a device which may provide additional functions and capabilities.

Accordingly, there is a need for a solution to at least one of the aforementioned problems.

SUMMARY OF THE INVENTION

The present invention is directed to a spoiler or stabilizer which provides stability and protection to both the towing vehicle and the travel device being towed. The spoiler or stabilizer may be removably secured to the pickup truck or other towing vehicle when needed.

In one aspect of the present invention, a spoiler or vehicle stabilizing apparatus comprises: a spoiler shell; an interior support frame; a mounting or attachment mechanism configured to attach the spoiler to a truck or other vehicle or trailer; and a plurality of lift mounts removably coupled to the spoiler for installation and removal of the spoiler from the truck.

In one aspect, the mounting or attachment mechanism may further comprise a pair of L-shaped brackets.

In one aspect, each L-shaped bracket of the pair of L-shaped brackets has a width of between about 8.5 to 11 inches.

In a further aspect, the plurality of lift mounts further comprises a pair of front jacks and a pair of rear jacks, each pair of jacks further comprising wheeled leveling jacks.

In one aspect, the spoiler shell may further include at least one top panel, a first side panel a second side panel, and at least one small side foil located at each side panel. The at least one small side foil may comprise a plurality of small side foils. The plurality of small side foils may comprise nine small side foils.

In one aspect, the spoiler is configured to cover a truck bed compartment.

In one aspect, the spoiler shell may further comprise a plurality of vehicle stabilizing panels coupled to the frame.

In a further aspect of the present invention, the spoiler may easily be installed or removed from the truck while the truck is being used to tow a caravan, travel trailer, camper, camper trailer or the like.

In a still further aspect of the present invention, the spoiler may be used as a multipurpose device. In one embodiment, the spoiler may provide a golf cart enclosure. In one embodiment, the spoiler may further comprise at least one utility shelf.

These and other features, aspects and advantages of the present invention will become better understood with reference to the following drawings, description and claims.

BRIEF DESCRIPTION OF THE DRAWINGS

The preferred embodiment of the claimed subject matter will hereinafter be described in conjunction with the appended drawings provided to illustrate and not to limit the scope of the claimed subject matter, where like designations denote like elements, and in which:

It is to be understood that like reference numerals refer to like parts throughout the several views of the drawings.

DETAILED DESCRIPTION OF THE INVENTION

Figure 1:
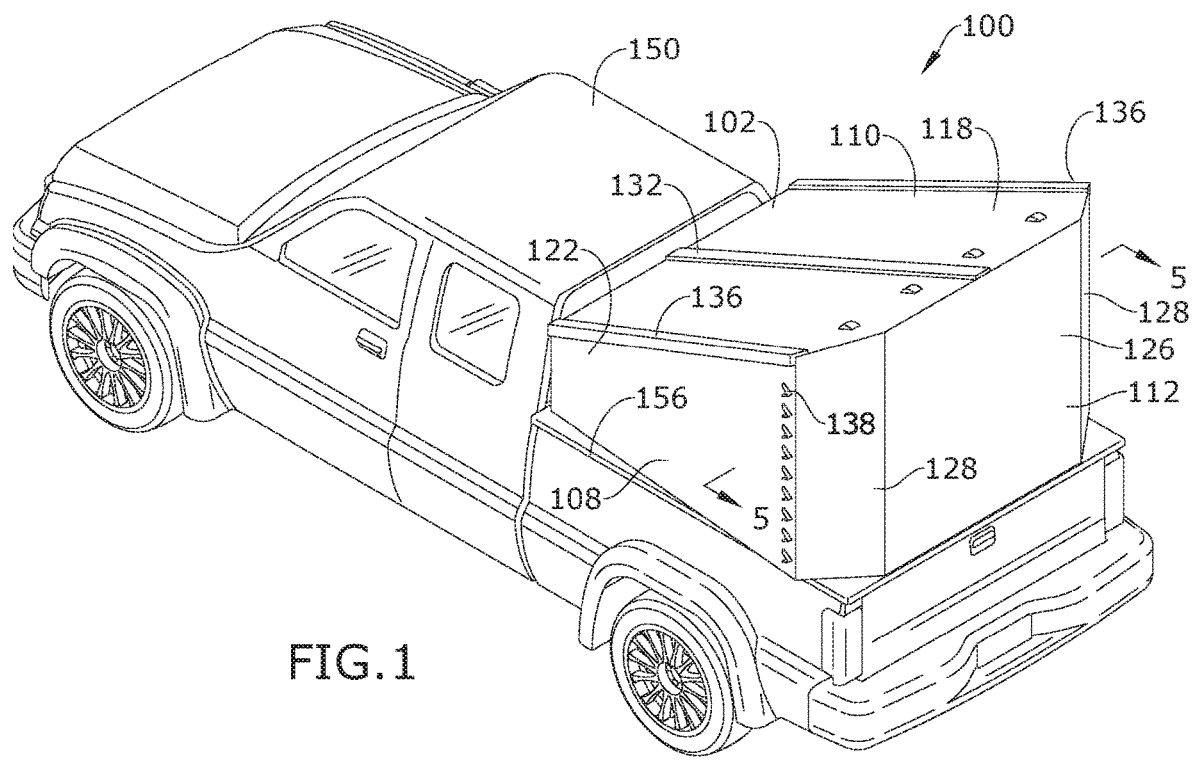
FIG. 1 presents a top perspective view of an embodiment of the present invention shown installed on a truck bed.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

As used herein, "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, as there is no intention to be bound by any express or implied theory presented in the preceding technical field, background, brief summary or the following detailed description, it is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Broadly, one embodiment of the present invention is a removable spoiler or stabilizer for pickup truck bed. The spoiler may be removably secured to the pickup truck when needed.

Advantageously, in an exemplary embodiment, the spoiler or stabilizer may comprise a spoiler shell constructed and arranged to fit securely on the truck bed of the pickup truck, an interior spoiler frame, at least one spoiler mounting support attachment device configured to secure to the truck and support the spoiler thereon, and a plurality of securement and lifting elements coupled to the spoiler for securement of the spoiler to the truck and for removal of the spoiler from the truck.

In some embodiments, the spoiler or stabilizer may include a spoiler shell which comprises adjustable legs with casters or wheels on a bottom portion thereof. In other embodiments, the spoiler shell may comprise a removable wheeled base portion for transporting on the ground or other surface, and to be easily moved and/or utilized off the vehicle. In some embodiments, the adjustable legs may be removable.

Advantageously, the spoiler or stabilizer may further include added features or components to provide added functionality for multiple purposes and uses during travel and storage, while installed on the vehicle, and even during storage.

Advantageously, the spoiler or stabilizer may be safely and quickly installed and removed. The removable spoiler or stabilizer may be installed or removed with any suitable device. Nonlimiting examples of such devices may include overhead crane, jacks, jack stands, cherry picker, auto cherry picker, cranes, travel trailer tongue-mounted lift/crane, lifts, roll on/off platform or the like, attached inside and/or out so that the spoiler or stabilizer may be lifted up so the tow vehicle can pull under/out. Embodiments having casters or wheels on the bottom, or a wheeled base, allow the operator to easily move the spoiler or stabilizer when not on the truck or towing vehicle.

The spoiler or stabilizer of the present invention may operate to reduce the wind forces encountered by a vehicle while towing a travel trailer, and ground a vehicle towing a travel trailer. In one embodiment, the spoiler reduces the wind at the front of a travel trailer being towed. The present invention may provide side wind displacement to maintain three-point suspension alignment.

The spoiler of the present invention may achieve control of wind force on the front of a travel trailer by treading the wind in front of the travel trailer with more of a slope while putting down force on the towing vehicle. The spoiler of the present invention may provide a larger surface area for treading wind and closer to the front preventing wind from coming back in.

The present invention makes the tow vehicle more stable, safer, aerodynamic, and provides heavier/increased traction to control a travel trailer, and increases fuel economy.

Further, the spoiler or stabilizer device is easily installed and easily removable from the pickup truck bed to allow for conventional use of the pickup up truck during travel and at home during times when the caravan, travel trailer, camper or camper trailer is not being towed.

In addition, the spoiler or stabilizer may provide additional multi-purpose features which enhance the functionality of the towing vehicle. Nonlimiting examples of such features may include, a car port for a golf cart, and at least one shelf.

Referring to the Figures, the present invention provides a removable and replaceable spoiler or vehicle stabilizing apparatus for a truck. The spoiler may be removably installed on the bed of a pickup truck or upon any other suitable vehicle. In one embodiment, the spoiler may be the size of the front of a travel trailer.

As shown at FIG. 1 through FIG. 6, in an exemplary embodiment, the spoiler, shown generally at 100, may comprise an exterior surface 102, an interior portion 104, a front portion 106 (best seen at FIG. 2), a rear portion 112, and side portions 108. The spoiler 100 may comprise a spoiler shell 110, an interior frame 114, and a pair of interior mounting supports 116.

In an exemplary embodiment, as shown at FIG. 1, and FIG. 3 through FIG. 6, the vehicle on which the spoiler is installed is a pickup truck 150 having a pickup truck bed 156, which is capable of hauling a trailer 158. The spoiler 100 is removably installed and securely supported on the truck bed 156 of the pickup truck 150. At FIG. 1, the spoiler 100 is shown installed on the truck bed 156.

Figure 2:
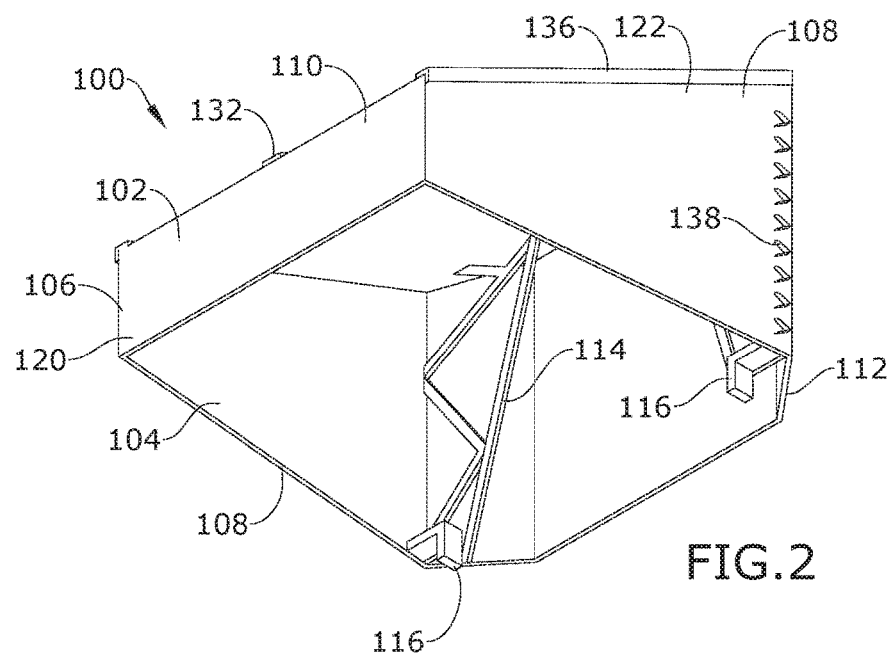
FIG. 2 presents a bottom perspective view of an embodiment of the present invention.
Figure 5:
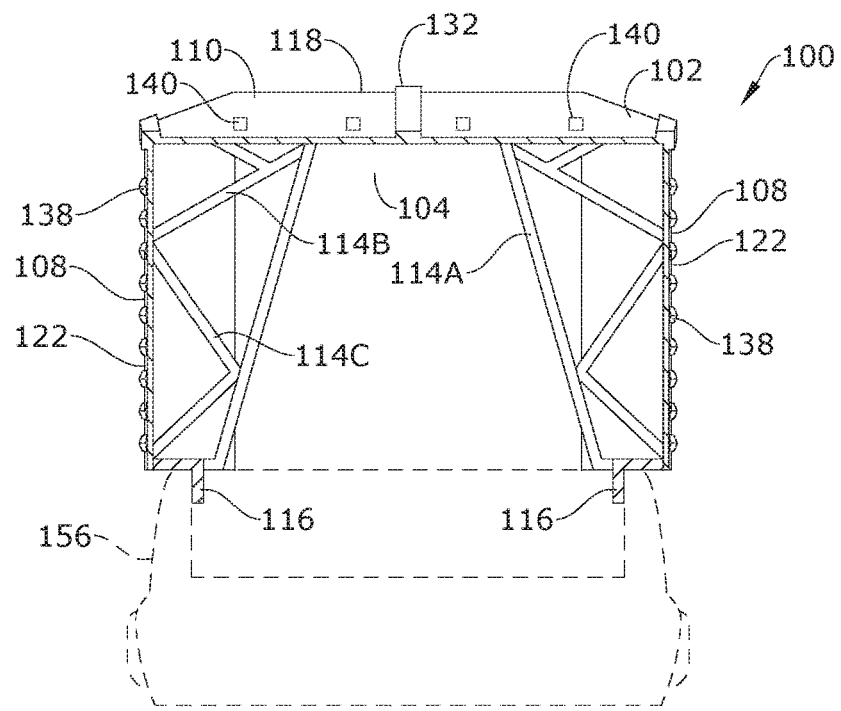
FIG. 5 presents a section view of the present invention, taken along line 5-5 of FIG. 1.

As shown at FIG. 5, a section view of the present invention, taken along line 5-5 of FIG. 1 provides additional detail of the structure of the spoiler 100. The spoiler 100 may comprise a spoiler shell 110, an interior frame 114, and a pair of interior mounting supports 116. As seen at FIG. 5, the interior frame further comprises an upper interior frame and a lower interior frame. As also seen at FIG. 5, the interior frame further comprises interior frame portions 114a, 114b and 114c: primary interior frame portion 114a, secondary interior frame portion 114b and tertiary interior frame portion 114c. In some embodiments, as best seen at FIGS. 2 and 5, the interior mounting supports 116 are L-shaped brackets.

Figure 3:
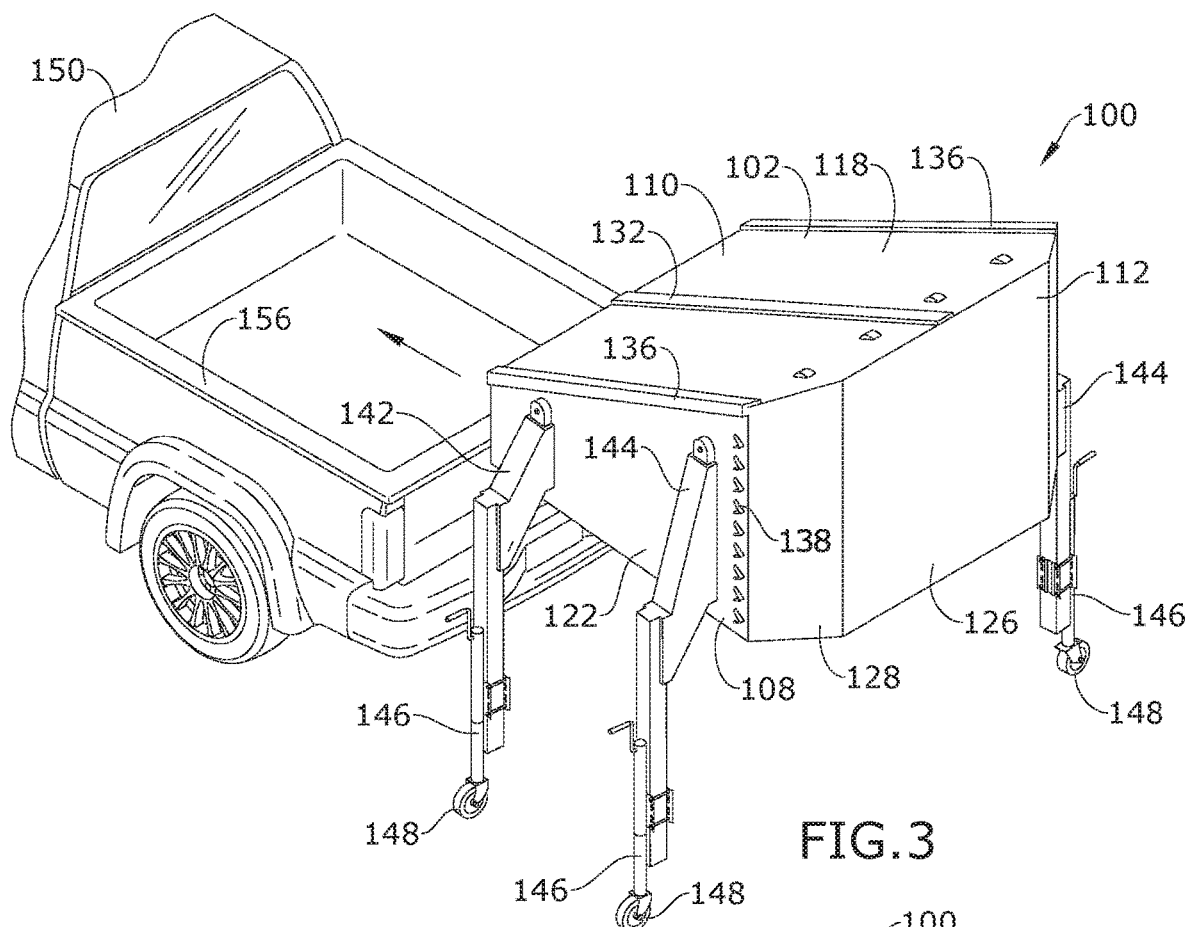
FIG. 3 presents a perspective view of an embodiment of the present invention with the front and rear side jacks attached and in a raised position for installation of the spoiler on a truck bed in accordance with aspects of the present disclosure.

In some embodiments, the spoiler shell 110 may comprise a plurality of exterior panels. In one embodiment, the exterior panels comprise at least one top panel 118 and at least two side panels 122. As shown at FIGS. 2-3, the spoiler shell 110 may comprise a first top panel, and side panels, coupled to the interior frame. In one embodiment, the spoiler top panel may comprise a single piece or unitary panel. In an alternative embodiment, the spoiler top may comprise first and second top panels. In one embodiment, the front portion 106 of the spoiler shell 110 may further comprise a front panel 120. In a further embodiment, the rear portion 112 of the spoiler may comprise a central rear panel 126 and rear outer panels 128. In one embodiment, exterior supports may be provided. The spoiler 100 may further comprise a top central support beam 132 and side L-shaped support beams 136.

In some embodiments, the spoiler may further include at least one small side foil. In other embodiments the spoiler may include a plurality of small side foils. As shown at FIGS. 1 through 6, in an exemplary embodiment, the spoiler may include nine small side foils 138.

Figure 4:
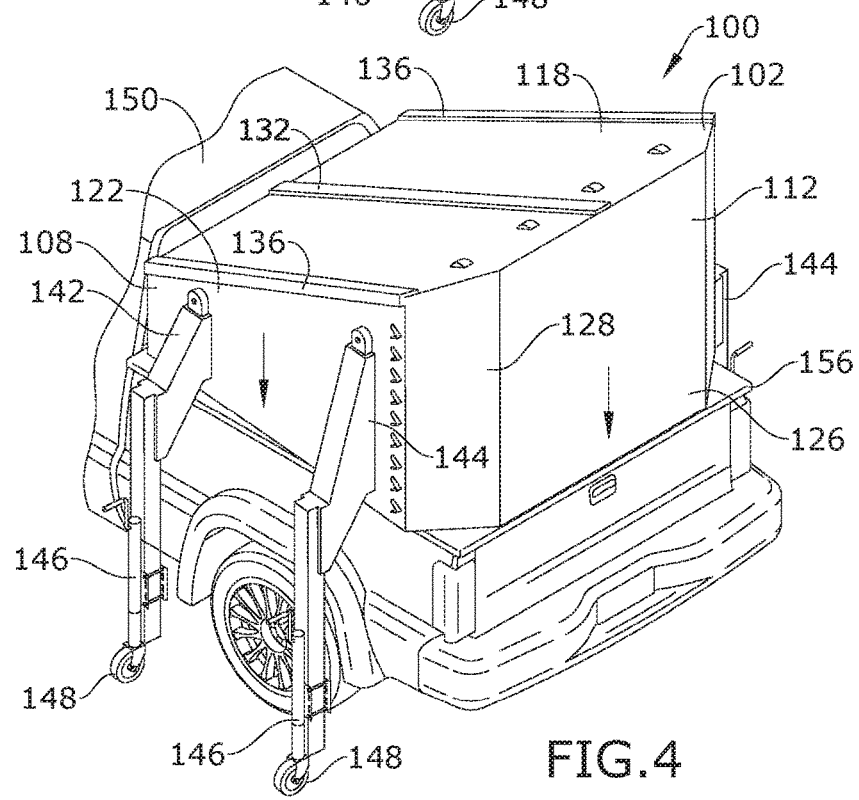
FIG. 4 presents a perspective view of an embodiment of the present invention illustrating the lowering of the leveling jacks for installation of the spoiler on a truck bed in accordance with aspects of the present disclosure.

In an exemplary embodiment, the spoiler 100 includes height-adjustable front side jacks 142 and rear side jacks 144. The front and rear side jacks are removably attached to the side portions 108 of the spoiler 100. The front and rear side jacks 142,144 may further include wheeled leveling jacks 146 attached to and extending downwardly therefrom. The wheels 148 of the wheeled leveling jacks 146 may include brakes, and may also be removable. As seen at FIG. 3, front and rear side jacks 142,144 are attached and in a raised position for installation of the spoiler 100 on a truck bed 156. As seen at FIG. 4, the leveling jacks 146 may be lowered for installation or removal of the spoiler 100 on a truck bed 156.

In an exemplary embodiment, the assembled spoiler is the size of a pickup truck bed that goes from the height of the roof to the height (9 ft) and width (8.5 ft) of a travel trailer. The spoiler sits on top of the pickup truck bed 156 with the L-shaped brackets 116 functioning as stop boards going inside the pickup truck bed 156.

In some embodiments, each L-shaped bracket has a width of between about 8.5 to 11 inches. In some embodiments, the spoiler 100 may have a different lower dimension than upper dimension. In some embodiments, the spoiler may have a bottom length dimension of about 6 feet 4 inches long, roughly the length of the truck bed. In some embodiments the spoiler may be from about 5.0-5.5 feet wide at the front portion 106 thereof, and between about 6.0-9.0 feet wide at the rear portion 112 thereof. In some embodiments, the width of the spoiler at the front portion 106 may be customized to a particular truck, truck bed or truck cab, and the width of the spoiler at the rear portion 112 may be customized to the size of the truck or the travel trailer. In some embodiments, the width of the spoiler center rear panel may be about 4.0 feet wide, while the width of the spoiler rear outer panels may vary depending on the size of the truck and/or travel trailer, though the total width of the rear portion 112 may be between about 6.0-9.0 feet. In some embodiments, the length of the top panel 118 and the length of the central support beam 132 are both about 8 feet. In some embodiments, the front portion 106 and front panel 120 of the spoiler 100 may be about 1.5 feet high by between about 5.0-5.5 feet wide (which may vary depending upon the width of the truck or the truck bed and may be customized). In some embodiments, the height of the spoiler center rear panel may be about 4 feet 8 inches, while the height of the rear portion may be about 5 feet. In some embodiments, in particular near the rear portion where the cross-section is taken along line 5-5, the width of the spoiler top portion may be about 6 feet, one inch, the interior height of the spoiler may be about 4 feet, 8 inches, the distance between interior frame portions 114a near the top portion of the spoiler 114a is about 2 feet, and the width of the interior mounting supports 116 may be about 9.5 inches. In some embodiments, the width of the interior mounting supports may be between about 8.5-11 inches. In some embodiments, the top panel has a top panel length of about 8 feet and a top panel width of between about 5-9 feet. In some embodiments, the top panel has a front top panel width of between about 5.0-5.5 feet and a rear top panel width of between about 6.0-9.0 feet. In some embodiments, the height of the spoiler may be between about 1.5 feet to about 9 feet.

Figure 6:
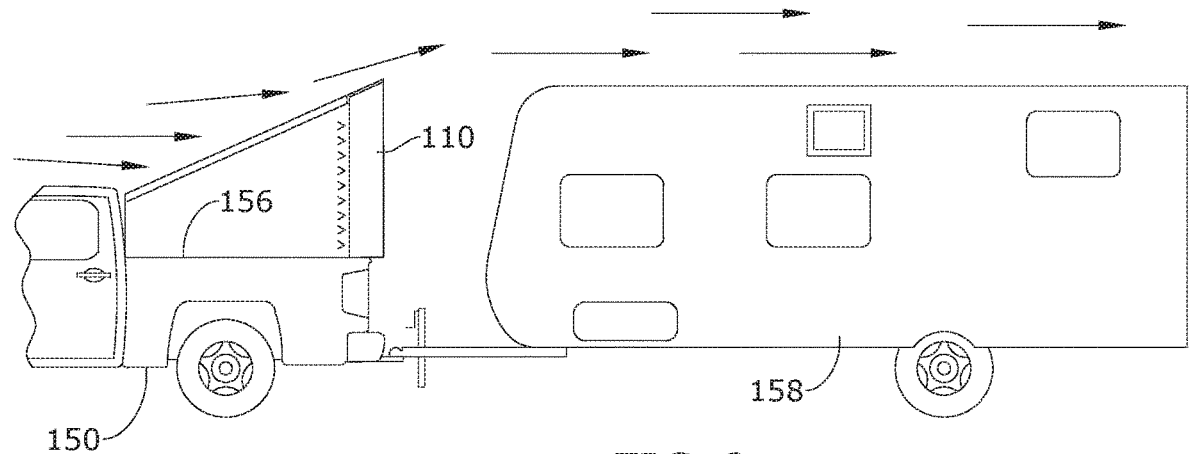
FIG. 6 presents a side schematic view of an embodiment of the present invention illustrating the deflecting of air by the spoiler shell in accordance with aspects of the present disclosure.

FIG. 6 presents a side schematic view of an embodiment of the present invention showing the spoiler 100 installed on a truck 150 while the truck is connected to an article to be towed 158. FIG. 6 illustrates the deflecting of air by the spoiler shell in accordance with aspects of the present disclosure.

In one embodiment for specific use with a pickup truck, the spoiler is more sloped, which reduces drag and places the force on the pulling vehicle instead of towed vehicle. The spoiler may also be easily removed when not towing a travel trailer.

In an exemplary embodiment, the spoiler or stabilizer of the present invention may be of a unitary construction, or be provided in an integral piece. In one embodiment, the spoiler or stabilizer may be made of panels which are cut in custom shapes and sizes.

In other embodiments, the spoiler may comprise multiple parts. In one embodiment, the spoiler or stabilizer or any of its components, may be made of any suitable material. For example, without limitation, in one embodiment, the spoiler or stabilizer or any component thereof may be made of wood, plywood, fiberglass, any suitable metal, steel, aluminum, carbon fiber, plastic or plastic composite or combinations thereof. In one embodiment, the components of which the spoiler is made may include 5 sheets of plywood.

In some embodiments, the spoiler may be fabricated by joining the parts together. For example, any wood parts may be glued, bolted or screwed together or combinations thereof. In one embodiment, the panels or components of the spoiler or stabilizer may be secured together with any suitable securement means, such as, for example without limitation, glue, adhesive, screws, bolts, snap fit, interference fit, or the like. In one embodiment, the spoiler of the present invention may further comprise hardware for easy installation and removal by the user.

In some alternative embodiments, the spoiler may be configured to sit on a truck autolock or self-lock system.

In other alternative embodiments, the spoiler shell may further comprise a plurality of panels coupled to the frame, wherein the plurality of panels comprises a front panel, at least one top panel, a rear panel, and side panels. Further, a mounting mechanism may comprise a mounting support associated with the interior frame of the spoiler. The mounting support may be constructed and arranged to securely fit onto a truck. In one embodiment the mounting support may comprise a plurality of adjustable legs. Each adjustable leg is attached to and adjustably extends downwardly from the spoiler. Each leg terminates at a distal leg end. A wheel is coupled to each leg at the distal leg end.

In some embodiments, the spoiler may comprise a plurality of vehicle stabilizing panels which may be coupled to the spoiler shell or spoiler body or frame. A spoiler receiver or support may be configured to secure to a truck and support the spoiler thereon. A removable mounting device or mechanism may be configured to removably attach the spoiler to the truck. A plurality of securement and lifting elements may be coupled to the spoiler for securement and removal of the spoiler from the truck.

In some embodiments, the spoiler or stabilizer may further be constructed and arranged to provide room for a golf cart on the truck bed. In one embodiment, the spoiler or stabilizer thereby provides an enclosure for protecting the golf cart from sun and weather during travel.

In some embodiments, the spoiler or stabilizer may further be constructed and arranged to provide shelving both in use installed on a truck bed or on another vehicle, or when being stored and not being used as a spoiler or stabilizer. In one embodiment, the spoiler may include at least one integral or installed shelf.

In some embodiments, the spoiler or stabilizer may further comprise wind directional channels. In an exemplary embodiment the spoiler may comprise at least one wind directional channel that is 3" tall and is constructed and arranged to extend along and down the top portion of the spoiler and/or rocket-like fins. The wind directional channel may maintain straight direction affect. Alternatively the spoiler or stabilizer may further comprise downforce amplifiers on the sides. In one embodiment the spoiler may comprise at least one downforce amplifier. In one embodiment, the spoiler includes between 3 and 4 downforce amplifiers that are 6" tall and curve upward and/or slightly outward to increase downforce and/or arrow straight like affect.

In one embodiment, the spoiler or stabilizer may be constructed and arranged to be installed over a truck bed toolbox. In one embodiment, the spoiler may comprise additional broken down compartments for tools. The additional tool storage compartments may be integral tool storage cabinets.

In one embodiment, the spoiler or stabilizer may further comprise at least one utility shelf.

In one embodiment, the spoiler is held or secured to the top of a truck bed with any suitable securement means. Nonlimiting examples of such securement means include bolts, welding/vise grips, C clamps, toggle locks, U-bolts, rope, ratchet straps, cable, eyelets, rings, or the like. Other embodiments may include various locking mechanisms to secure the spoiler to the truck.

In certain embodiments, the spoiler may include four top securement points 140 by which the spoiler which may be tethered to the truck bed. In certain embodiments, the spoiler may be secured by U-bolts in a cross-pattern. In certain embodiments, the securement means may further include rope, ratchet straps or cable.

In some embodiments, the plurality of securement and lifting elements comprises at least one of lift mounts, forklift slots, toggle locks, eye bolts, lift rings, bolts/plates, hooks and combinations thereof. The securement and lifting elements may be utilized to secure the spoiler to the truck or other vehicle, and to install or remove the spoiler from the truck or other vehicle. Grips or handles may be provided to make it easier for the user to secure, install or remove the spoiler.

In some embodiments, markers, turn or brake lights or other electronic devices or safety devices may be installed on the spoiler. Further, toggle locks, eye bolts, bolts, plates, hooks or other functional devices may be installed.

In an exemplary embodiment, the assembled spoiler may be the size of a pickup truck bed that goes from the height of the roof to the height (9 ft) and width (8.5 ft) of a travel trailer. The spoiler may sit on top of the pickup truck bed with stop boards going inside. The lower portion of the spoiler may be locked to the top of the pickup truck bed, or may be fastened to other parts of the pickup truck bed and/or vehicle frame, with fastening elements. Nonlimiting examples of such fastening elements may include toggle locks, C clamps, cam lever nuts/bolts, 4 or 5 star quick release knobs/bolts, nuts/bolts, truck topper/cap clamps, and/or bar clamps (for use on lifting hardware as well), and then tethered from four top points to the bed. The spoiler may also be coupled to the truck bed and/or U-bolts or eye bolts with ratchet straps, cable, and/or rope.

In one embodiment, when not towing, the spoiler may remain installed in place or alternatively may be removed.

In some embodiments, the spoiler may also be installed and removed using an overhead crane, jacks, jack stands, cherry picker, auto cherry picker, cranes, travel trailer tongue-mounted lift/crane, any suitable construction machinery or construction vehicle, lifts, roll on/off platform or the like. In some embodiments, any such device may be connected or attached to the interior or exterior of the spoiler by suitable means to enable the spoiler to be lifted up so the tow vehicle can pull under or out. Balance weight may be added to aid in crane lifting and/or change the center of gravity lift points. The spoiler may further comprise one or more additional elements and features including but not limited to folding, installed after, rubber, down and out wings on the bottom in the back, and combinations thereof.

In some embodiments, the spoiler may comprise a built-in generator and/or vented generator cubby hole with/without door inside and/or out.

In some embodiments, the spoiler may be made using different shapes. The above-mentioned materials and spoiler components may be shaped to allow the spoiler of the present invention to be wider, taller, lighter, or longer. In some embodiments, the spoiler may be constructed and arranged to start over the vehicle windshield. In some embodiments, the spoiler may be open or enclosed in back, and may include such additional features as doors, windows, cargo securement/protection and/or structural support. In some embodiments, the spoiler may be constructed and arranged to be more aerodynamic, or change dynamics. In some embodiments, the spoiler may include combinations of any of the above features. For example, without limitation, the spoiler of the present invention may be constructed and arranged to be more flush with the rear wind shield of the pickup truck, to put more down force in front of rear axle, and/or in any direction. In some embodiments, the spoiler may include rubber bumpers.

In some embodiments, the spoiler shell further may further comprise a plurality of panels coupled to the frame, and a mounting mechanism. The plurality of panels may comprise a front panel, at least one top panel, a rear panel, and side panels. The mounting mechanism may comprise a mounting support associated with the spoiler shell. The mounting support may be constructed and arranged to securely fit onto a pickup truck bed. In one embodiment, the mounting support may further comprise a perimeter and a plurality of adjustable legs. Each adjustable leg may be attached to and adjustably extend downwardly from the perimeter. Each leg may terminate at a distal leg end. A wheel may be coupled to each leg at a distal leg end.

In some embodiments, the spoiler further comprises a base panel.

In some embodiments, the spoiler may be installed on a truck while the truck is connected to an article to be towed.

In some embodiments, the removable and replaceable spoiler may be a multipurpose device. The spoiler may be constructed and arranged to provide a covering for a golf cart parked on the truck bed therebeneath. The spoiler may provide a golf cart enclosure. In some embodiments, the spoiler may further comprise at least one utility shelf.

In some embodiments, the spoiler may include a cherry picker top bumper assembly in accordance with an exemplary embodiment of the present invention.

In some embodiments, the spoiler may include a means of attachment side rail which may be interior or exterior. In other embodiments, the spoiler may include a cherry picker lift bar or a four-way chain bar assembly, which may be made of steel, and may be foldable or extendable. Said bar may comprise a first bar end and a second bar end, each end being flanged for securement with bolts, which may be any suitable bolt, for example without limitation, a ⅞" bolt. The side rail may further comprise a 4×6 over the bolts at the center point of weight. In other embodiments of the present invention, multiple jack construction types may be included.

It should be understood, of course, that the foregoing relates to exemplary embodiments of the invention and that modifications, variations and changes in detail may be made without departing from the spirit and scope of the invention as set forth in the following claims.

What is claimed is:

1. A spoiler comprising:
    a spoiler shell constructed and arranged to fit securely on a vehicle bed of a vehicle, wherein the spoiler shell further comprises a plurality of panels coupled to the interior frame, wherein the plurality of panels comprises a front panel, at least one top panel, a rear panel, and side panels, and wherein the rear panel further comprises a center rear panel and two outer rear panels;
    an interior spoiler frame;
    at least one spoiler mounting support attachment device configured to secure to the vehicle and support the spoiler thereon; and
    a plurality of securement and lifting elements coupled to the spoiler for securement of the spoiler to the vehicle and for removal of the spoiler from the vehicle.

2. The spoiler of claim 1 wherein the at least one spoiler mounting support attachment device comprises at least one L-shaped bracket.

3. The spoiler of claim 1 wherein the spoiler shell further comprises a plurality of vehicle stabilizing panels coupled to the interior frame.

4. The spoiler of claim 1 wherein the plurality of securement and lifting elements comprises at least one of jacks, lift mounts, forklift slots, toggle locks, eye bolts, lift rings, bolts, plates, hooks and combinations thereof.

5. The spoiler of claim 1 wherein the spoiler further comprises four top securement points.

6. The spoiler of claim 1 wherein the plurality of securement and lifting elements further comprises:
    a pair of front side jacks;
    a pair of rear side jacks;
    a pair of front wheeled leveling jacks attached to and extending downwardly from the pair of front side jacks, each said front wheeled leveling jack further comprising a removable wheel; and
    a pair of rear wheeled leveling jacks attached to and extending downwardly from the pair of rear side jacks, each said rear wheeled leveling jack further comprising a removable wheel.

7. The spoiler of claim 1 wherein the front panel has a front panel height of about 1.5 feet high, and a front panel width of between about 5.0-5.5 feet.

8. The spoiler of claim 1 wherein the top panel has a top panel length of about 8 feet and a top panel width of between about 5-9 feet.

9. The spoiler of claim 8 wherein the top panel has a front top panel width of between about 5.0-5.5 feet and a rear top panel width of between about 6.0-9.0 feet.

10. The spoiler of claim 1 wherein the rear panel has a rear panel width of about 9.0 feet.

11. The spoiler of claim 1 wherein the center rear panel has a center rear panel width of about 4.0 feet and a center rear panel height of about 4 ft 8 inches.

12. The spoiler of claim 1, wherein the spoiler is installed on the vehicle while the vehicle is connected to an article to be towed.

13. The spoiler of claim 1 having a bottom length dimension corresponding to the length of the vehicle bed.

14. The spoiler of claim 1 having a front portion with a front portion width corresponding to the width of the vehicle bed or a vehicle cab and a rear portion having a rear portion width corresponding to the width of the vehicle or a travel trailer.

15. The spoiler of claim 1 wherein the front portion width is between about 5.0-5.5 feet, and the rear portion width of between about 6.0-9.0 feet.

16. The spoiler of claim 1 wherein the interior spoiler frame comprises an upper interior frame, a lower interior frame, and a plurality of interior frame portions.

\* \* \* \* \*